Figure 1:
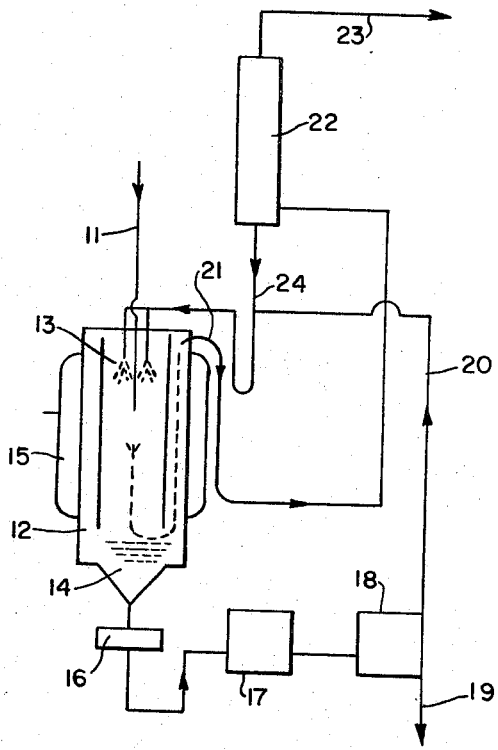

Aug. 29, 1967  L. FOULLETIER  3,338,898
PROCESS FOR THE PRODUCTION OF CYANURIC CHLORIDE
Filed Aug. 10, 1965

INVENTOR.
LOUIS FOULLETIER
BY Pennie, Edmonds,
Morton, Taylor and Adams
ATTORNEYS 3,338,898
PROCESS FOR THE PRODUCTION OF CYANURIC CHLORIDE
Louis Foulletier, Lyon, France, assignor to Ugine Kuhlmann, Paris, France, a French company
Filed Aug. 10, 1965, Ser. No. 478,672
Claims priority, application France, Aug. 11, 1964, 984,771
9 Claims. (Cl. 260—248)

This invention relates to the production of cyanuric chloride and more particularly to a process for the recovery of substantially pure cyanuric chloride from a gaseous mixture containing the same.

Cyanuric chloride is an important chemical of commerce which finds applications as an intermediate in the chemical industry for the manufacture of dyestuffs, pharmaceuticals, foods, resins and others. It can be prepared in a number of different processes and among them notably is the process in which hydrogen cyanide and gaseous chlorine are reacted under various conditions. The cyanuric chloride thus produced is in a gaseous form and is mixed with other incondensable or less easily condensable gases such as hydrogen chloride, chlorine, cyanogen and cyanogen chloride. Conventionally the cyanuric chloride produced is recovered from the gaseous mixture by condensation using air or other inert gases as coolants. The condensation equipment required to handle a large volume of gases are necessarily bulky and subject to frequent shutdown due to clogging by the wax-like condensation product.

I have now found that substantially pure cyanuric chloride can be recovered from a gaseous mixture containing the same in a simple process which requires less bulky equipments than heretofore used in the prior recovery processes without the inherent danger of clogging by the condensation product. Broadly stated, the present process comprises condensing cyanuric chloride in the gaseous mixture onto the surfaces of droplets of a liquid solvent for cyanuric chloride, dissolving the condensed cyanuric chloride in the solvent and recovering the solution containing the same.

The process of this invention is advantageously carried out by feeding simultaneously and separately into a condensation chamber the gaseous mixture containing cyanuric chloride and the liquid solvent in the form of fine droplets. The condensed cyanuric chloride dissolves readily in the solvent and the resultant solution is collected at the bottom of the chamber. Depending on the solvent used, the solution is maintained at as high a temperature as practical, preferably at or near its boiling point to facilitate the dissolution of the condensed product and to provide a maximum solubility. In some instances, however, it is advantageous to maintain the solution at a lower temperature to avoid high vapor pressure to avoid interference with the pumping operation.

The gaseous mixture in the synthesis plant is kept advantageously at a temperature sufficiently high to allow the cyanuric chloride to remain in a gaseous state. At a lower temperature, however, some of the cyanuric chloride may solidify which must be maintained in the form of fine solid particles suspended in the gaseous stream for the subsequent recovery operation in order not to lower the process efficiency.

The solvent used in the present invention can be a number of organic compounds in liquid form at normal temperatures and with boiling points below 200° C. For example, the solvent may be one or a mixture of a number of organic solvents such as halogenated derivatives of aliphatic or aromatic hydrocarbons, aromatic hydrocarbons or their nitro-derivatives, ketones or ethers. More specifically, I find benzene, carbon tetrachloride, chloroform, dioxane, acetone and acetonitrile to be eminently suitable as solvents for the present invention.

To recover the dissolved cyanuric chloride, from the solution, it is preferred that the solution be first filtered to remove impurities and other undesirable insolubles such as entrained dust, fine catalyst particles, corrosion products of the apparatus, particularly the chlorides of iron or nickel, and secondary products from the reaction that produces cyanuric chloride. After filtration, the solution may be advantageously cooled to allow the crystallization of the dissolved cyanuric chloride. A temperature as low as that approaches the freezing temperature of the solvent may be used to expedite the crystallization operation. In practice, however, temperatures in the range of 0° C. to 20° C. are sufficient. The crystals of cyanuric chloride precipitated from the crystallization process are readily recovered in a conventional manner such as by filtration. After removal of the cyanuric chloride, the filtered liquid may then be recycled for further use.

The gaseous mixture stripped of cyanuric chloride is further processed to recover other valuable gaseous components contained therein. In the specific instance in which the gaseous mixture contains only cyanogen, cyanogen chloride and a small quantity of solvent, the gaseous mixture can be directly fedback to the cyanuric chloride synthesis plant for reuse. On the other hand, if the gaseous mixture contains, in addition, a substantial amount of hydrogen chloride, chlorine and some unremoved cyanuric chloride, the gaseous mixture may be preferably treated in an absorption tower containing absorbents such as activated carbon to remove the chlorine, cyanuric chloride, cyanogen, and cyanogen chloride from the gaseous mixture. The resultant hydrogen chloride is then recovered in either hydrous form or as an aqueous acid. The absorbed gaseous components can be removed from the absorbent by treating the absorbents at a higher temperature than used for the absorption operation. When activated carbon is used for the absorption operation, a temperature about 200° C. is sufficient to remove the absorbed gaseous components from it.

If the cyanuric chloride produced is to be used as an intermediate for the manufacture of other valuable cyanuric chloride derivatives, the solution containing the cyanuric chloride collected in the condensation chamber may be used directly without the necessary operation for isolating the cyanuric chloride from the solvent. It is desirable in such case to select a solvent for the condensation operation which may also be used as a solvent in the subsequent synthesis reaction. Further to illustrate the invention, detailed description of specific examples is presented herein below with reference to the accompanying drawings in which FIG. 1 and FIG. 2 illustrate two alternative procedures for the recovery of cyanuric chloride in accordance with the invention.

Figure 2:
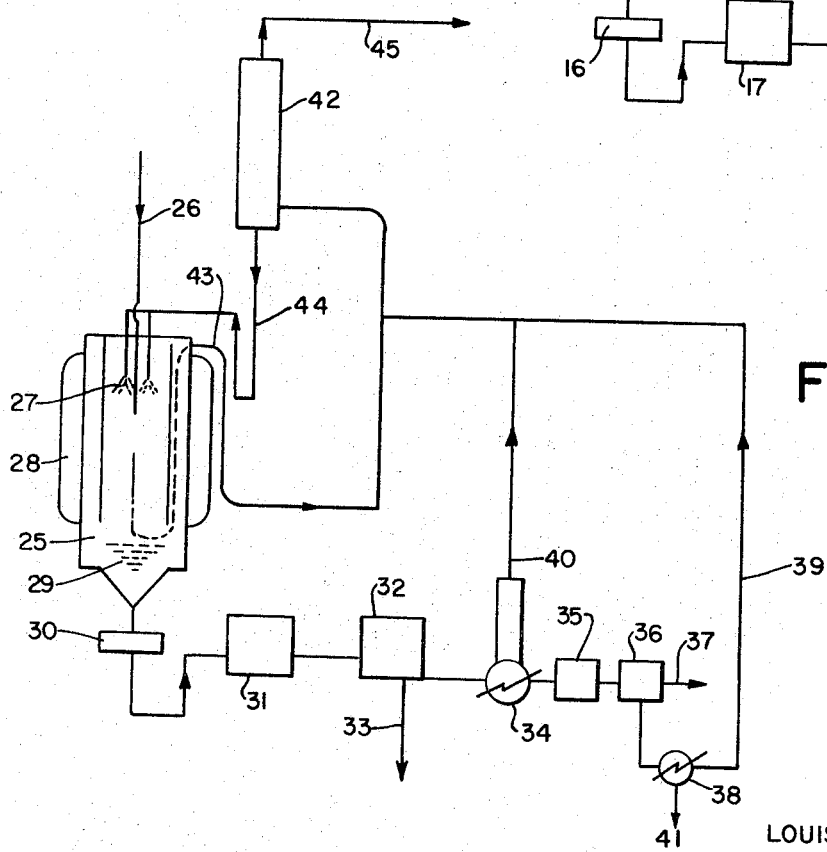

Using the flow sheet illustrated in FIG. 1, cyanuric chloride was recovered from a gaseous mixture containing the following molar compositions:

| | Percent |
|---|---|
| Cyanuric chloride | 16.6 |
| Cyanogen chloride | 5.5 |
| Cyanogen | Traces |
| Chlorine | 22.6 |
| Hydrogen chloride | 55.3 |

This gaseous mixture was synthesized in accordance with the process described in my French Patent No. 1,311,400, using a gaseous mixture of chlorine and hydrogen cyanide with the ratio of $Cl_2/HCN = 1.41$. The gaseous mixture was fed at 170° C. through the conduit 11 into a condenser chamber 12 from its top. Simultaneously carbon tetrachloride was sprayed into the chamber 12 from its top by way of atomizers 13. The fine droplets of carbon tetrachloride immediately served as condensation surfaces for the cyanuric chloride thereby removing it from the gaseous mixture. The condensed cyanuric chloride readily dissolved into the solvent and was collected at the bottom 14 of the chamber. The condenser chamber 12 is equipped with a water jacket 15 which was used during the condensation operation to control the temperature in the chamber and to maintain the temperature of the solutions at the bottom 14 of the chamber at about 76° C. The weight ratio of carbon tetrachloride used and the amounts of cyanuric chloride in the gaseous mixture introduced into the chamber 12 was maintained at about 5.75. The cyanuric chloride solution collected at the bottom 14 of the chamber contained approximately 31 grams of cyanuric chloride to 100 grams of carbon tetrachloride.

To isolate the cyanuric chloride the solution first passed through a filter 16 to remove insoluble impurities contained therein before it was fed into a conventional Swenson-Walker crystallizer 17 which operates by cooling the solution in a longitudinal trough with a semicircular cross section and equipped with an annular cooling water jacket at its bottom. The magma was continuously agitated by a long-pitch spiral agitator to keep the crystallization from blanking off the heat transfer surface and to agitate continuously the magma to obtain more uniform crystallization conditions. At the end of the crystallizer 17 the magma was approximately 10° C. The solvent and the crystals were separated in a conventional drying station 18. The dried crystal of cyanuric chloride was removed from the drying station by conveyor 19 and the solvent recovered was recycled to the condenser chamber by pipe 20. The cyanuric chloride crystals obtained have a melting point of 146.5° C. and for each part by weight of cyanuric chloride produced 3.2 parts by weight of solvent was recovered for reuse.

The gaseous mixture after stripped of the cyanuric chloride was withdrawn from the condenser chamber through conduit 21. The entrained solvent was removed from the gaseous mixture with a gas condsener 22 which operated at a temperature approximately about −20° C. The incondensable gas was removed through outlet 23 for further process to recover other components in the gaseous mixture. The condensed solvent was removed through liquid outlet 24 and mixed with the liquids of the solvent recovered from the drying station and was recycled for reuse in the condensation chamber 12. The gas condenser 22 removed approximately 13.5 to 7 parts by weight of carbon tetrachloride per each 100 parts by weight of crystallized cyanuric chloride. The incondensable gaseous mixture upon further process in an absorption tower lined with activated carbon of the microporous coconut type yielded 60% to 70% cyanogen chloride and about 80% of free chlorine of the amount in the original gaseous mixture.

When the gaseous mixture contains a substantial amount of relatively high boiling point compound, the alternative procedures as illustrated by the flow sheet showing in FIG. 2 may be advantageously employed. In the specific example cyanuric chloride was recovered from a gaseous mixture having the following molar composition:

| | Percent |
|---|---|
| Cyanuric chloride | 29 |
| Cyanogen chloride | 21 |
| Cyanogen | Traces |
| Hydrogen chloride | 50 |

This gaseous mixture if treated in a conventional gas condensation process in a cold chamber would produce a condensation product which has practically no melting point and decomposes at about 310° C.

Using the process of this invention, this gaseous mixture was first fed at 170° C. into the condensation chamber 25 by gas conduit 26 connected to the top of the condensation chamber. Carbon tetrachloride was simultaneously sprayed into the chamber by atomizer 27 to cause the immediate condensation of the cyanuric chloride from the incoming gases. Water was circulated in the outer water jacket 28 of the chamber to maintain the temperature in the collected solution at the bottom 29 of the chamber at about 76° C. The weight ratio of the carbon tetrachloride used and the cyanuric chloride in the gaseous stream was about 5.4.

The collected solution initially pased through filter 30 to remove insoluble impurities and was subsequently crystallized in a Swenson-Walker crystallizer 31. The crystal and the solvent were separated in a drying station 32. The crystal recovered through conveyor 33 has a melting point of 146.5° C.

The liquid component from the drying station 32 which contains additional cyanuric chloride was further processed by first feeding it into an evaporator 34 which separated it into a gas and liquid fractions. The liquid fraction was then fed to a second crystallizer 35 and the magma obtained was forwarded to a second drying station 36 in which dry crystals of cyanuric chloride was recovered from outlet 37. The cyanuric chloride obtained from the second drying station has a melting point of 146° C. The liquid recovered from the second drying station 36 was evaporated in heater 38 and the resultant vapor was combined with the gas fraction from the evaporator 34 by gas conduits 39 and 40 respectively. The residue in the heater 38 was removed through outlet 41. The recycled gases in conduits 39 and 40 were fed into a gas condenser 42 together with the stripped gases in gas conduit 43 from the chamber 25. The condensed product was removed and fed into the condensation chamber 25 by pipe 44 for reuse. The incondensable gases were removed from outlet 45 for further process to recover other gaseous components.

Based on the amount of cyanuric chloride in the incoming gaseous mixture, the cyanuric chloride recovered from the first and second drying operations were 76% and 22% respectively for a total yield of about 98%. A white product was also recovered from the filter 29 which decomposes at 310° C. without melting. This insoluble residue amounted to approximately 10% of the cyanuric chloride yield. Although the gaseous mixture used in this example is seldom encountered in practice, nevertheless, it was used to illustrate the versatility and effectiveness of this invention for recovering cyanuric chloride from a gaseous mixture.

The corrosive gases such as hydrogen chloride and chlorine in the gaseous mixture generally require expensive corrosion resistant materials for the construction of the process equipments. In the process of this invention, however, cheaper and more readily available materials such as steel can be used for the construction of the apparatus because of the lower temperatures employed (as shown in the examples described above in which the temperatures do not exceed 76° C.).

I claim:
1. A process for the recovery of cyanuric chloride from a gaseous mixture containing the same which comprises condensing and dissolving said cyanuric chloride into a normally liquid solvent for cyanuric chloride, cooling the resultant solution to a temperature below the crystallization temperature of cyanuric chloride to effect crystallization of the dissolved cyanuric chloride, separating and recovering the cyanuric chloride from the liquid solvent.

2. A process for the recovery of cyanuric chloride from a gaseous mixture containing the same which comprises feeding said gaseous mixture to a condensation chamber, simultaneously feeding a normally liquid solvent for cyanuric chloride into said chamber to cause the cyanuric chloride in said gaseous mixture to condense and to dissolve into the liquid and recovering the resultant cyanuric chloride solution.

3. A process for the recovery of substantially pure cyanuric chloride from a gaseous mixture containing the same which comprises feeding said gaseous mixture to a condensation chamber, simultaneously feeding a normally liquid solvent for cyanuric chloride into said chamber to cause the cyanuric chloride in said gaseous mixture to condense and to dissolve into the liquid, cooling the resultant cyanuric chloride solution to a temperature below the crystallization temperature of cyanuric chloride to precipitate it from the solution, separating and recovering the resultant cyanuric chloride from the solvent.

4. A process for the recovery of substantially pure cyanuric chloride from a gaseous mixture containing cyanuric chloride, cyanogen chloride, cyanogen, chlorine and hydrogen chloride which comprises feeding said gaseous mixture to a condensation chamber, simultaneously spraying a normally liquid solvent for cyanuric chloride into said chamber to cause the cyanuric chloride in said gaseous mixture to condense and to dissolve into the liquid, filtering the resultant solution to remove insolubles contained therein cooling the filtered cyanuric solution below the crystallization temperature of cyanuric chloride to precipitate cyanuric chloride crystals from the solution, filtering the crystals from the solution, and drying the crystals.

5. A process for the recovery of substantially pure cyanuric chloride from a gaseous mixture containing cyanuric chloride, cyanogen chloride, cyanogen, chlorine and hydrogen chloride which comprises feeding said gaseous mixture into a condensation chamber, simultaneously spraying a normally liquid solvent for cyanuric chloride into said chamber, said liquid solvent having a boiling point below about 200° C. to cause the cyanuric chloride in the gaseous mixture to condense and to dissolve therein, maintaining said liquid solvent at a temperature near the boiling point of said solvent, filtering the resultant cyanuric chloride solution to remove solid impurities contained therein, cooling the filtered solution at a temperature between 0° and 20° C. to crystallize the cyanuric chloride from the solution, separating the cyanuric chloride crystals from the liquid, and drying the crystals.

6. A process according to claim 5 wherein the solvent is benzene, carbon tetrachloride, chloroform, dioxane, acetone or acetone nitrile.

7. A process for the recovery of substantially pure cyanuric chloride from a gaseous mixture containing cyanuric chloride, cyanogen chloride, cyanogen, chlorine and hydrogen chloride which comprises feeding said gaseous mixture into a condensation chamber, simultaneously spraying carbon tetrachloride into said chamber to cause condensation of said cyanuric chloride on the surfaces of carbon tetrachloride droplets, dissolving the condensed cyanuric chloride in the carbon tetrachloride, maintaining the resultant solution at about 76° C., filtering the solution to remove impurities contained therein, cooling the solution to a temperature to a range between about 0° C. to 20° C. causing crystallization of the dissolved cyanuric chloride, separating the crystalized cyanuric chloride from the solution and drying the crystals to obtain a substantially pure cyanuric chloride having a melting point of about 146.5° C.

8. The process according to claim 7 wherein the solution after the crystals of cyanuric chloride are separated therefrom is recycled to the condensation chamber.

9. A process for the recovery of substantially pure cyanuric chloride from a gaseous mixture containing the same and other high boiling point compounds which comprises feeding said gaseous mixture into a condensation chamber, simultaneously spraying carbon tetrachloride into said chamber to cause condensation of said cyanuric chloride on the surfaces of carbon tetrachloride droplets, dissolving the condensed cyanuric chloride in the carbon tetrachloride, maintaining the resultant solution at about its boiling point, filtering the solution to remove impurities contained therein, cooling the solution to a temperature in a range between about 0° C. to 20° C. to cause crystallization of the dissolved cyanuric chloride, separating the crystals from the solution, recovering the crystals, subjecting the solution separated therefrom to an evaporation process to recover a liquid fraction, cooling the liquid fraction to a temperature between about 0° C. to about 20° C. to cause crystallization and recovering the crystals therefrom.

References Cited
UNITED STATES PATENTS

| | | | |
|---|---|---|---|
| 3,120,522 | 2/1964 | Olson et al. | 260—248 |
| 3,179,662 | 4/1965 | Zinsstag et al. | 260—248 |

WALTER A. MODANCE, *Primary Examiner.*

JOHN D. RANDOLPH, *Examiner.*

JOHN M. FORD, *Assistant Examiner.*